3,220,796
PROCESS FOR THE REMOVAL OF ARSENIC OR ARSENIC COMPOUNDS
Mariano Hernandez-Vaquero Espinosa, Madrid, Spain, assignor to Empresa Nacional Calvo Sotelo de Combustibles Liquidos y Lubricantes S.A., Madrid, Spain
No Drawing. Filed Sept. 14, 1961, Ser. No. 137,955
Claims priority, application Spain, Sept. 21, 1960, 261,165
8 Claims. (Cl. 23—136)

This invention relates to a process for the removal of the arsenic occurring in elemental form or in the form of compounds of arsenic in various materials, for example to the treatment of arsenic-containing materials, in which the presence of arsenic or its compounds has adverse effects on the processing of said materials.

In the conventional processes for recovering the arsenic from raw materials containing it, it is difficult to attain sufficiently complete separation of the arsenic. Furthermore in certain catalytic treatments the arsenic becomes incorporated in the catalyst and considerably modifies the activity or reduces the efficiency of the catalyst. The regeneration of catalysts poisoned by arsenic presents considerable difficulties in many cases. The practically complete removal of arsenic from ores is also of great importance in many metallurgical processes.

In general it can be said that the arsenic and its compounds are considered as harmful ingredients in many industrial processes and as undesirable impurities in many products and their practically complete removal from such processes and products is desirable or even necessary in many cases.

Numerous processes have been, therefore, suggested in the prior art for the separation of arsenic and its compounds from accompanying materials. In some of the processes, which can be denoted as dry methods, the arsenic-containing materials are heated in the presence or absence of air at temperatures of 600–800° C., or said materials are mixed with pyrite, sulfur or oxidizing agents and heated to temperatures above 500° C., or the materials are treated with chlorine, hydrochloric acid, carbonyl chloride or sulfur chloride diluted with inert gas, to temperatures of 600–900° C. In the so-called wet methods, the arsenic-containing materials are treated with a non-oxidizing acid and subjected to subsequent heating, if desired; furthermore, the materials may be reacted with oxidizing acids or treated with oxidizing or non-oxidizing alkaline solutions.

Most of the above mentioned prior art methods are not generally applicable and are applicable only to specific materials, depending on the form in which the arsenic occurs in the respective materials. The above mentioned dry methods are in most cases not capable of removing the arsenic from many materials, in which the arsenic is present in the form of non-volatile compounds. Uniform mixing of the arsenic-containing materials with other solid products may present difficulties and certain admixed products, e.g. pyrite, cannot be removed from the mixture by subsequent heating. Furthermore, the treatment in such mixtures usually requires relatively high temperatures, e.g. 800° C. The wet methods which use oxidizing or non-oxidizing acids are, as a rule, complicated and, moreover, they often produce essential changes in the material treated. The alkaline treatments require the use of expensive reagents and the application of high pressure in the use of some of the oxidizing alkaline agents.

The main object of the present invention is to provide a novel and improved process by which the arsenic occurring in elemental form or in the form of compounds of arsenic can be practically completely removed and recovered from various materials such as catalysts, nickel ores, pyrites, without the above mentioned difficulties or disadvantages.

Other objects and the advantages of the invention will be apparent from the following specification and the appended claims.

According to the present invention, arsenic occurring in elemental form or in the form of compounds of arsenic can be separated and recovered from materials containing it, e.g. catalysts poisoned by arsenic, ores such as nickel ores, pyrites, arsenic ores and others, by passing through the arsenic-containing materials a current of hydrogen sulfide and steam at temperatures in the range of 300° to 900° C., the temperature used depending upon the type and characteristics of the material treated. The formation of arsenic sulfide can take place at lower temperature levels, but it is desirable to operate at temperatures above 300° C. if the simultaneous volatilization of the arsenic sulfide is required, e.g. 300–900° C. The presence of steam facilitates the formation and volatilization of the arsenic sulfide. However, in the treatment of certain materials the use of steam is not desirable or possible, instead of steam an inert gas can be used. The arsenic sulfide formed in the present process is of great purity.

As in the process of this invention normally a heterogeneous reaction between solids and gases takes place, the reaction will be promoted by improving the contact between the solids and gases. As mentioned above, the process of the invention can be carried out at a minimum temperature of 300° C., but higher temperatures have a rather favorable influence on the formation of arsenic sulfide and its volatilization. A suitable particle size of the material treated has likewise an essential influence on the efficiency of the process, as will be described in more detail hereinafter.

It has been found that a good contact between the reacting substances and an appropriate particle size can be best accomplished by the use of fluidized bed techniques described by way of example in the following Examples 3 and 4, which show that the removal of arsenic is made more complete and the reaction period is shortened by the use of these techniques.

The use of high temperatures is limited by the fusibility or softening of the material to be treated, because melting or softening result in a reduction of the contact surface and therefore decrease the velocity of reaction and the volatilization of the arsenic sulfide formed.

It has been found that in the removal of arsenic from catalysts used in the hydrogenation of oil shale distillates, practically complete removal can be obtained even if the catalysts are treated by the present process in their usual pellet form. Thus, it is possible to apply this process without affecting the physical characteristics of the starting material treated.

The following examples describe some specific embodiments of and best modes for carrying out the invention, to which the invention is not limited.

Example 1

One kilogram of used BASF catalyst 8376 poisoned by arsenic due to a more than one year use in the treatment with hydrogen of Puertollano shale oil, was charged into an electrically heated stainless steel vertical furnace and heated to 500° C. in a stream of hydrogen sulfide and steam. The catalyst was in the form of cylindrical pellets of 10 x 10 mm. The arsenic sulfide produced was recovered in a box provided with transverse baffles. The results obtained were as follows:

|  | Percent |
| --- | --- |
| Arsenic content of the catalyst to be treated | 4.84 |
| Arsenic content after 5 hours of treatment | 2.30 |
| Arsenic content after 10 hours of treatment | 0.99 |
| Arsenic content after 15 hours of treatment | 0.44 |
| Arsenic content after 20 hours of treatment | 0.15 |

Example 2

A stream of hydrogen sulfide and nitrogen was passed during 20 hours through pyrite having a particle size of 1–3 mm. heated to a temperature of 550° C. The pyrite starting material contained 0.73% of arsenic and 39.62% of sulfur. After 20 hours of the treatment the material contained 0.11% of arsenic and 40.81% of sulfur.

Example 3

A nickel ore containing no sulfur was treated in a stream of hydrogen sulfide and steam under such conditions that a fluidized bed was maintained throughout the whole operation. The temperature was raised rapidly up to 700° C. Samples were taken and examined at 600° C., 700° C. and then at one hour intervals. The results were as follows:

|  | Percent |
| --- | --- |
| Initial arsenic content of the ore | 9.20 |
| Arsenic content upon reading 600° C. | 3.07 |
| Arsenic content after 1 hour at 700° C. | 2.24 |
| Arsenic content after 2 hours at 700° C. | 0.92 |
| Arsenic content after 3 hours at 700° C. | 0.53 |
| Arsenic content after 4 hours at 700° C. | 0.28 |
| Arsenic content after 5 hours at 700° C. | 0.10 |

Example 4

Pyrite containing 1.12% of arsenic and 39.6% of sulfur was treated in a fluidized bed in a stream of hydrogen sulfide and steam. The temperature was rapidly raised to 700° C. The following results were obtained:

|  | Percent |
| --- | --- |
| Arsenic content of the pyrite when 600° C. was reached | 0.37 |
| Arsenic content of the pyrite when 700° C. was reached | 0.076 |
| Arsenic content after 1 hour at 700° C. | 0.056 |
| Arsenic content after 2 hours at 700° C. | 0.048 |
| Arsenic content after 3 hours at 700° C. | 0.031 |
| Arsenic content after 4 hours at 700° C. | 0.019 |

After 5 hours' treatment at 700° C. the material contained no arsenic and its sulfur content was 38.47%.

It will be understood that this invention is not limited to the details specifically described above and can be carried out with various modifications. The catalyst "BASF 8376" mentioned in the above example contains as its ingredients $S_2W$, $NiS$ and $Al_2O_3$ and also contains impurities, such as oil, carbonaceous material and arsenic. The vertical furnace mentioned in Example 1 had an interior volume of about 1 liter. The volume of $H_2S$ passed through the furnace in my tests was in the range of 1 liter to 500 liters per hour at 20° C. and 710 mm. Hg and the volume of steam in the range of 50 liters to 500 liters per hour at 710 mm. Hg and 500° C. In the above Example 1, the volumes of hydrogen sulfide and steam passed through the furnace were:

$H_2S$ _____ 50 liters per hour at 20° C. and 710 mm. Hg
Steam __ 200 liters per hour at 500° C. and 710 mm. Hg In the above Example 2 the volume of hydrogen sulfide and nitrogen passed through the pyrite were:

$H_2S$ ____ 100 liters per hour at 20° C. and 710 mm. Hg
$N_2$ _____ 100 liters per hour at 20° C. and 710 mm. Hg The composition of the nickel ore used in the above Example 3 was:

|  | Percent |
| --- | --- |
| Ni | 17.04 |
| As | 9.20 |
| S | 0.38 |
| $SiO_2$ | 26.21 |
| $Fe_2O_3$ | 32.3 |
| $Al_2O_3$ | 5.2 |

The fluidized bed used in the above Example 3 was the nickel ore of the above stated composition. The size of the particles was 64–576 mesh/cm.$^2$.

In the above Example 3, I used 400 grams of the nickel ore, 100 liters per hour of steam at 700° C. and 710 mm. Hg and the volume of $H_2S$ needed to maintain the bed fluidized was about 250 liters per hour at 20° C. and 710 mm. Hg.

The fluidized bed used in Example 4 was pyrite (S=39.61%; Fe=40.27%; As=1.12%. The size of the pyrite particles was 64–576 mesh/cm.$^2$). In Example 4, I used 400 grams of pyrite, 150 liters per hour of steam at 700° C. and 710 mm. Hg and the volume of $H_2S$ needed to maintain the bed fluidized was about 400 liters per hour at 20° C. and 710 mm. The arsenic sulfide formed in the process of this invention is a yellow powder of the formula $As_2S_3$. However, when the operation starts, a certain quantity of arsenic sulfide in form of red crystals is initially formed, which have the composition $As_2S_2$.

In general the above mentioned volumes of gases are referred to the recycled gas ($H_2S$ or $H_2S$—$N_2$) and not for the steam which condenses, since in all cases the gases are recycled. Fresh gas ($H_2S$ or $H_2S$—$N_2$) is injected at a rate of 0.5–4.0 liters per hour, which is the same at which the gas is eliminated from the cycle, so that the composition of the gas is maintained practically constant. The arsenic sulfide is recovered by cooling of the gaseous stream and by the effect of the baffles. Towers filled with hollow aluminum cylinders can also be used for the recovery of arsenic sulfide. The percent data of arsenic, sulfur, etc., refer to elementary arsenic, sulfur, etc. Instead of nitrogen other inert gases can also be used.

These and other modifications can be made without departing from the scope of the invention as defined in the appended claims.

It will be appreciated that the process of this invention is of high utility due to the above mentioned advantages, e.g. its applicability to arsenic-containing materials of varied character, such as metals, ores and others and the possibility of practically complete removal and recovery from said materials of the arsenic in pure condition.

What is claimed is:

1. A process for separating arsenic from ores and catalyst compositions containing arsenic in a form selected from the group consisting of elementary arsenic and arsenic compounds, comprising bringing said ores and catalyst compositions in solid form in contact with a gaseous stream of $H_2S$ and a gaseous medium selected from the group consisting of steam and inert gases in order to convert the arsenic and arsenic compounds present in said materials into $As_2S_3$ and separate the latter in volatilized form from the materials treated.

2. A process as claimed in claim 1, in which a stream of $H_2S$ and steam is brought in contact with the material treated at a temperature in the range of 300 to 900° C.

3. A process as claimed in claim 1, in which the inert gas is nitrogen.

4. A process as claimed in claim 1, in which the inert gas is carbon dioxide.

5. A process as claimed in claim 1, in which the inert gas is combustion gases.

6. A process as claimed in claim 1, in which the arsenic-containing material and the gaseous stream are brought in contact in a fluidized bed.

7. A process as claimed in claim 1, in which the gaseous stream is used in a cycle with a substantially constant composition.

8. A process as claimed in claim 1, in which the inert gaseous medium is steam.

References Cited by the Examiner

UNITED STATES PATENTS

| | | | |
|---|---|---|---|
| 1,606,343 | 11/1926 | Burdick | 23—136 |
| 2,847,281 | 8/1958 | Ortuno et al. | 23—177 |

OTHER REFERENCES

Jacobson: Encyclopedia of Chemical Reactions, vol. 1, pages 293, 329, 330 and 350, Reinhold Publ. Co. (1946).

MAURICE A. BRINDISI, *Primary Examiner.*